United States Patent
Olive

(10) Patent No.: US 7,864,193 B2
(45) Date of Patent: Jan. 4, 2011

(54) RGB COLOR CONVERSION PALETTES

(75) Inventor: Jose Antonio Olive, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 692 days.

(21) Appl. No.: 11/772,586

(22) Filed: Jul. 2, 2007

(65) Prior Publication Data

US 2009/0009528 A1  Jan. 8, 2009

(51) Int. Cl.
G09G 5/00 (2006.01)
G09G 5/02 (2006.01)
H04N 5/46 (2006.01)
H04N 5/57 (2006.01)
G03F 3/08 (2006.01)
H04N 1/46 (2006.01)
G06K 9/40 (2006.01)
G06K 9/00 (2006.01)
G06K 9/36 (2006.01)

(52) U.S. Cl. .................. 345/600; 345/428; 345/581; 345/589; 345/606; 358/518; 358/525; 358/461; 348/557; 348/673; 348/687; 382/162; 382/274; 382/254; 382/300

(58) Field of Classification Search ......... 345/426–428, 345/581, 586, 589–590, 600–601, 606, 643, 345/617–618; 358/518–519, 523–525, 447–448, 358/461, 516; 382/162, 167, 254, 274, 276, 382/300; 348/557, 560, 578, 673, 678, 660
See application file for complete search history.

(56) References Cited

U.S. PATENT DOCUMENTS

| 5,119,186 | A | | 6/1992 | Deacon et al. |
| 5,307,182 | A | * | 4/1994 | Maltz .................. 358/518 |
| 5,343,311 | A | * | 8/1994 | Morag et al. ............. 358/518 |
| 5,572,632 | A | * | 11/1996 | Laumeyer et al. ......... 358/1.17 |
| 5,732,205 | A | | 3/1998 | Astle |
| 6,529,192 | B1 | * | 3/2003 | Waupotitsch ............. 345/419 |
| 6,724,507 | B1 | * | 4/2004 | Ikegami et al. ............ 358/518 |
| 6,982,723 | B1 | * | 1/2006 | Szymaniak ............... 345/611 |
| 2007/0177230 | A1 | * | 8/2007 | Kreysar et al. ............ 358/504 |

FOREIGN PATENT DOCUMENTS

WO  WO 2005/027506 A1  3/2005

* cited by examiner

Primary Examiner—Wesner Sajous
(74) Attorney, Agent, or Firm—Novak Druce + Quigg

(57) ABSTRACT

A method for color conversion includes calculating distances between color coordinates in a conversion palette and a color coordinate for a pixel and assigning the pixel a color coordinate of the closest color coordinates in the conversion palette. The color coordinates in the conversion palette include a first point and a second point in an RGB color cube on a neutral axis of said RGB color cube and on opposite surfaces of a first sphere, a third point and a fourth point on the neutral axis and on opposite surfaces of a second sphere and on the neutral axis, and a plurality of other points distributed over a surface of the first sphere and around the neutral axis, where a volume of the second sphere is twice the volume of the first sphere, and a center of the first and second spheres is a center of the RGB color cube.

20 Claims, 5 Drawing Sheets

RGB COLOR CONVERSION PALETTES

FIELD OF THE INVENTION

The present invention is related to the field of color conversion and more particularly, to systems and methods for converting images using RGB color palettes.

BACKGROUND OF THE INVENTION

In general, when images are presented on a display or stored in a memory element of a computing device, the total number of colors used for the image may be reduced to account for display device, the processing device, the memory element, or transmission limitations. Typically, this is accomplished by converting the color of each pixel in an image to one of a limited number of colors. Generally this limited number of colors is referred to as a palette. Any number of colors can be included in a palette, but generally the number of colors in a palette is limited to a subset of all possible colors. However, color conversion of some images using such palettes, can result in converted images that are unrealistically colored or aesthetically displeasing.

SUMMARY OF THE INVENTION

This Summary is provided to comply with 37 C.F.R. §1.73, requiring a summary of the invention briefly indicating the nature and substance of the invention. It is submitted with the understanding that it will not be used with to interpret or limit the scope or meaning of the claims.

In a first embodiment of the invention, a method for color conversion in RGB color space includes calculating a distance between each one of a plurality of color coordinates in a conversion palette and a color coordinate for a pixel in an image and assigning a new color coordinate to the pixel. The new color coordinate comprises a closest one of the plurality of color coordinates in the conversion palette, where the plurality of color coordinates in the conversion palette includes a first point and a second point on a neutral axis of an RGB color cube and on opposite surfaces of a first sphere, a third point and a fourth point on the neutral axis of the RGB color cube and on opposite surfaces of a second sphere, and a plurality of other points evenly distributed over a surface of the first sphere and symmetrically distributed around the neutral axis, where a volume of the second sphere is twice the volume of the first sphere, and where a center of the first sphere and a center of the second sphere is a center of the RGB color cube.

In a second embodiment of the invention, a system for color conversion includes a mass storage element for storing a conversion palette, where the conversion palette comprises a plurality of colors in RGB color space. The plurality of color coordinates in the conversion palette includes a first point and a second point on a neutral axis of an RGB color cube and on opposite surfaces of a first sphere, a third point and a fourth point on the neutral axis of the RGB color cube and on opposite surfaces of a second sphere, and a plurality of other points evenly distributed over a surface of the first sphere and symmetrically distributed around the neutral axis, where a volume of the second sphere is twice the volume of the first sphere, and where a center of the first sphere and a center of the second sphere is a center of the RGB color cube. The system also includes a processing element for assigning a new color coordinate to a pixel in an image from the plurality of colors in the conversion palette, where the new color coordinate comprises one of the plurality of color coordinates in the conversion palette closest in the RGB color space to an original color coordinate for the pixel.

In a third embodiment of the invention, a computer-readable storage medium is provided, having stored thereon, a computer program having a plurality of code sections, the code sections executable by a computer for causing the computer to perform the steps of calculating a distance in RGB color space between each one of a plurality of color coordinates in a conversion palette and a color coordinate for a pixel in an image and assigning a new color coordinate to the pixel, where the new color coordinate comprises a closest one of the plurality of color coordinates in the conversion palette. The plurality of color coordinates in the conversion palette includes a first point and a second point on a neutral axis of an RGB color cube and on opposite surfaces of a first sphere, a third point and a fourth point on the neutral axis of the RGB color cube and on opposite surfaces of a second sphere, and a plurality of other points evenly distributed over a surface of the first sphere and symmetrically distributed around the neutral axis, where a volume of the second sphere is twice the volume of the first sphere, and where a center of the first sphere and a center of the second sphere is a center of the RGB color cube.

DETAILED DESCRIPTION

Figure 1:
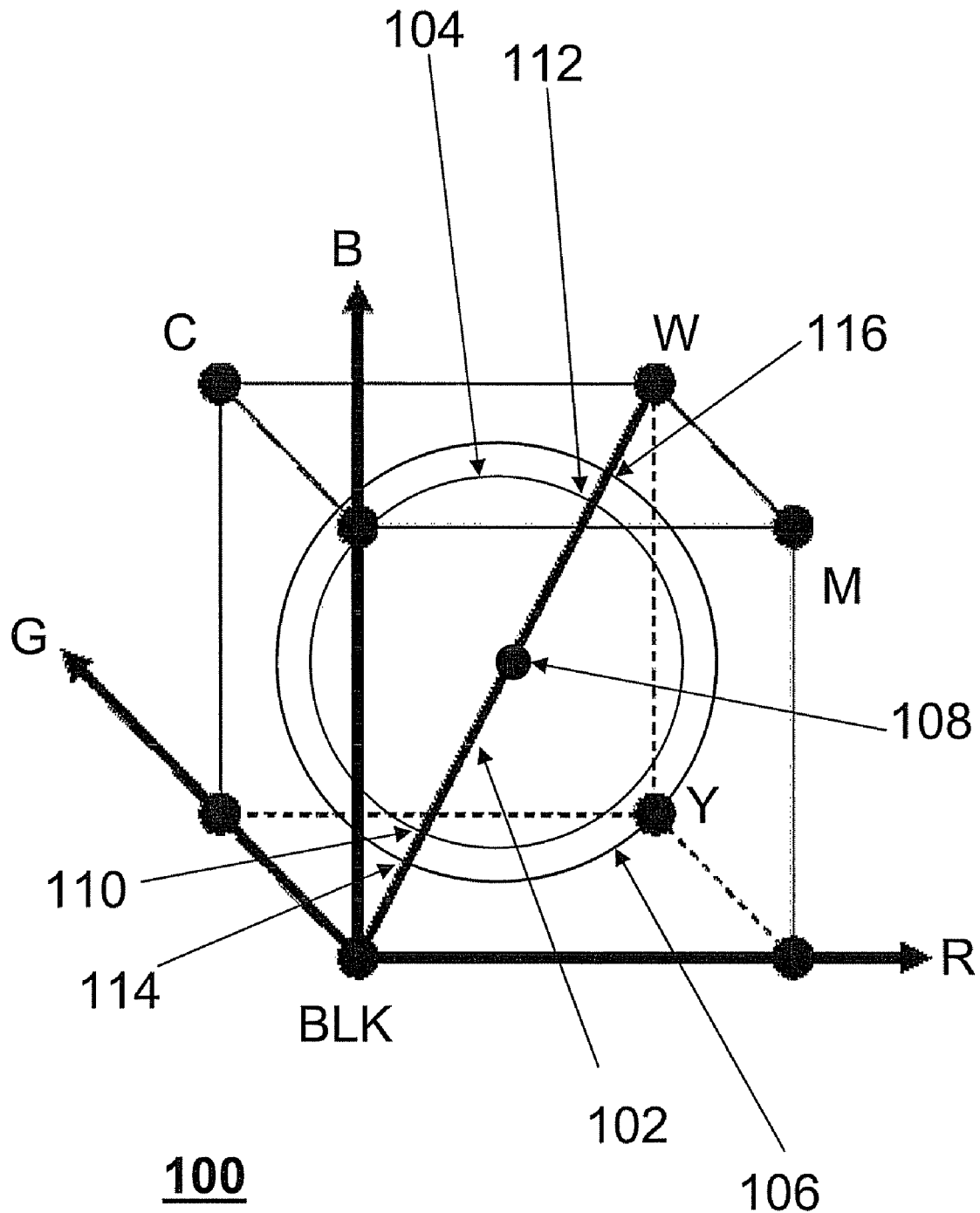
FIG. 1 is a schematic view of an RGB color cube for defining a color palette in RGB space according to an embodiment of the present invention.

The present invention is described with reference to the attached figures, wherein like reference numerals are used throughout the figures to designate similar or equivalent elements. The figures are not drawn to scale and are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant arts, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

FIG. 1 depicts an RGB color cube 100. As commonly used in the art, an RGB color cube 100 is used to provide a mapping scheme to represent RGB color space as a three-dimensional (3D) space. Each coordinate axis R, G, B for the color cube 100 represents values of red, green, or blue, i.e. the primary colors in an RGB color space. Furthermore, because colors in the RGB color space are based on the addition of intensities of red, green, and blue, the colors act like vectors. That is, primary colors can be combined by addition and subtraction to obtain all the other colors in the RGB color cube 100.

Thus, as shown in FIG. 1, the origin BLK of the cube 100 represents black, or the total absence of color. The far corner W of the cube 100 from the origin is the sum of the highest intensities of red, green, and blue. This produces the color white at the far corner W, as shown in FIG. 1. The other corners of the cube C, M, Y represent the various secondary colors. In RGB color space, as previously described, the primary colors include red, green, and blue. The combination of any two of these primary colors results in the secondary colors in the RGB color space, cyan (C), magenta (M), and yellow (Y), the other corners of the color cube 100.

The main diagonal or neutral axis 102 of the RGB cube 100 is illustrated as a line drawn between the origin BLK and far corner W. This line represents all the colors in the RGB cube that include equal intensities of red, green, and blue. Thus, all the points on the neutral axis 102 include all possible shades of gray, ranging from black to white. Consequently, the closer a color coordinate on the neutral axis 102 is to the origin BLK of the cube 100, the darker the gray. Similarly, the closer the color coordinate on the neutral axis 102 is to the far corner W, the lighter the gray.

Therefore, using a coordinate system for the RGB color cube bounded by (0, 0, 0) and (255, 255, 255), it is generally possible to define over 1.6 million colors in the RGB color space using coordinates (n, n, n), wherein n=0, 1, 2, . . . 255. Generally, this number of colors is sufficient to display a realistically colored image to the human eye using a computer display. However, in some instances, it is not desirable or possible to define such a large number of colors. For example, a computing system can have a limited amount of resources to display or store the image. As generally known in the art, an increased number of colors results in an increased amount of data that needs to be stored and processed for storing and displaying the image. Additionally, the increased amount of data imposes a larger bandwidth requirement for transmitting the image in a timely fashion. As a result, the number of colors in some applications needs to be reduced in order to reduce display, storage, and/or bandwidth requirements.

One method of reducing the number of colors in images is to reduce the number of coordinates to be used in the RGB color cube by using an indexed color conversion palette that defines a subset of all possible colors to be used in coloring an image. Although a color conversion palette that includes hundreds of colors can still provide a pleasing image to the human eye, as the number of colors is further reduced, a converted image can appear aesthetically unpleasing or be unrealistically colored.

However, typical methods for generating a color conversion palette provide unsatisfactory results, especially in the case of photographic images. For example, if the color coordinates for the conversion palette are limited to those defined by (85n, 85n, 85n), where n=0, 1, 2, or 3, the conversion palette still spans the entire RGB color space, but defines only a total of 64 colors. In another example, if the color coordinates for the conversion palette are limited to those defined by (255n, 255n, 255n), where n=0 or 1, the conversion palette still spans the entire RGB color space, but defines only a total of 16 colors. This enables the amount of memory needed in the index for storing color information for a single pixel to be reduced from 24 bits to 6 or 4 bits. However, this type of conversion method that limits the total number of colors by limiting color coordinates generally provides unrealistic or aesthetically displeasing coloring. As a result, such methods are typically limited to applications in which it is not necessary to render realistic-looking images.

In the embodiments of the invention, alternate methods for selecting the color coordinates in the RGB cube 100 to include in an RGB conversion palette are provided. In particular, the present invention provides for selection of colors based on a mathematical relationship to the center 108 of the RGB color cube 100.

The center 108 of the RGB color cube 100 lies upon the cube diagonal 102. As previously described, the cube diagonal 102 is comprised of all the possible shades of gray, that is, the neutral colors. Therefore, at the center 108, the intensities of red, green, and blue are not only equal to each other, but also the brightness of the colors lies between a minimum amount (BLK) and a maximum amount (W). Thus, one aspect of the invention is a color conversion palette that includes color coordinates selected based on a common mathematical relationship to the center 108 of the color cube 100, which can provide an improved color conversion palette. Another aspect is that the color conversion palette of the present invention can provide images that are typically more realistic and/or aesthetically pleasing.

In embodiments of the invention, color coordinates for the color conversion palette can be selected from color coordinates in the RGB color cube 100 lying on the surfaces of one or more spheres 104, 106 projecting from the center 108 of the RGB cube 100. By selecting color coordinates on the surface of a sphere projected in the RGB color cube 100, differences in hue, brightness, and saturation between the colors on the surface of the sphere can provide a more accurate color conversion than is achieved with color coordinates selected using conventional methods.

Accordingly, such a selection method can be used to define a color conversion palette including color coordinates for a light gray color, a dark gray color, a white color, a black color, and non-neutral colors. In some embodiments, pure white or black is not provided in the color conversion palette. Rather, the color is approximated using a nearby color coordinate to preserve the mathematical relationship between the color coordinates in the conversion palette. Furthermore, the color coordinates for non-neutral colors can be selected from color coordinates evenly distributed over the surface of the sphere 104 and symmetrically about the neutral axis 102.

In an exemplary embodiment, in order to provide white, black, and grey colors, the color coordinates to be included in the conversion palette can be selected from the intersections of the neutral axis 102 with the surface of a small sphere 104 and a larger sphere 106 projecting from the cube center 108. For example, the intersections of a smaller sphere 104 with neutral axis 102 can be used to define a dark gray color and a light gray color. Thus, a color coordinate for a dark gray color can be defined by the intersection 110 closest to the origin BLK of the cube 100 and a color coordinate for a light gray color can be defined by the intersection 112 farthest from the origin BLK of the color cube 100. Similarly, a sphere 106 having a larger radius than sphere 104 can be used to define black and white. Thus, color coordinates for black can be defined by the intersection 114 closest to the origin BLK of the cube 100 and a color coordinate for white can be defined by the intersection 116 farthest from the origin BLK of the cube 100. Although the difference between the radii of the spheres can vary, as the difference between the spheres 104, 106 is increased, the greater the contrast will be between the resulting colors defined as dark grey and light grey and the resulting colors defined as black and white, respectively. In one embodiment of the present invention, the larger sphere 106 encloses a volume twice that of the small sphere 104 and provides sufficient contrast.

Further, in order to provide color coordinates for non-neutral colors, the color coordinates to be included in the conversion palette can be selected from other points on the surface of the spheres 104, 106 within the RGB color cube 100. In certain embodiments, the non-neutral color coordinates can be selected from any number of points evenly distributed over the surface of the spheres 104, 106 and symmetrically distributed around the neutral axis 102. For example, the color coordinates selected for the conversion palette can be selected from a grid of evenly spaced points projected along a surface of the sphere 104. However, the color coordinates can also be selected based on a mathematical relationship between the color coordinates and the center 108 of the color cube 100.

In accordance with the present invention, one possible mathematical relationship for defining the color coordinates for non-neutral colors can be based on the vertices of a symmetric polyhedron. Therefore, by example and not by way of limitation, the color coordinates can be defined by the vertices of symmetric polyhedrons such as a cube, an octahedron, a dodecahedron, or an icosahedron. As commonly known in the art, the spatial relationship between the vertices of a symmetric polyhedron provides for an even distribution of points over the surface of a sphere and about one or more axes of symmetry. Therefore, such a polyhedron can be used to define the color coordinates on the surface of a sphere and still provide a symmetric and even arrangement of color coordinates about the neutral axis 102.

Figure 2:
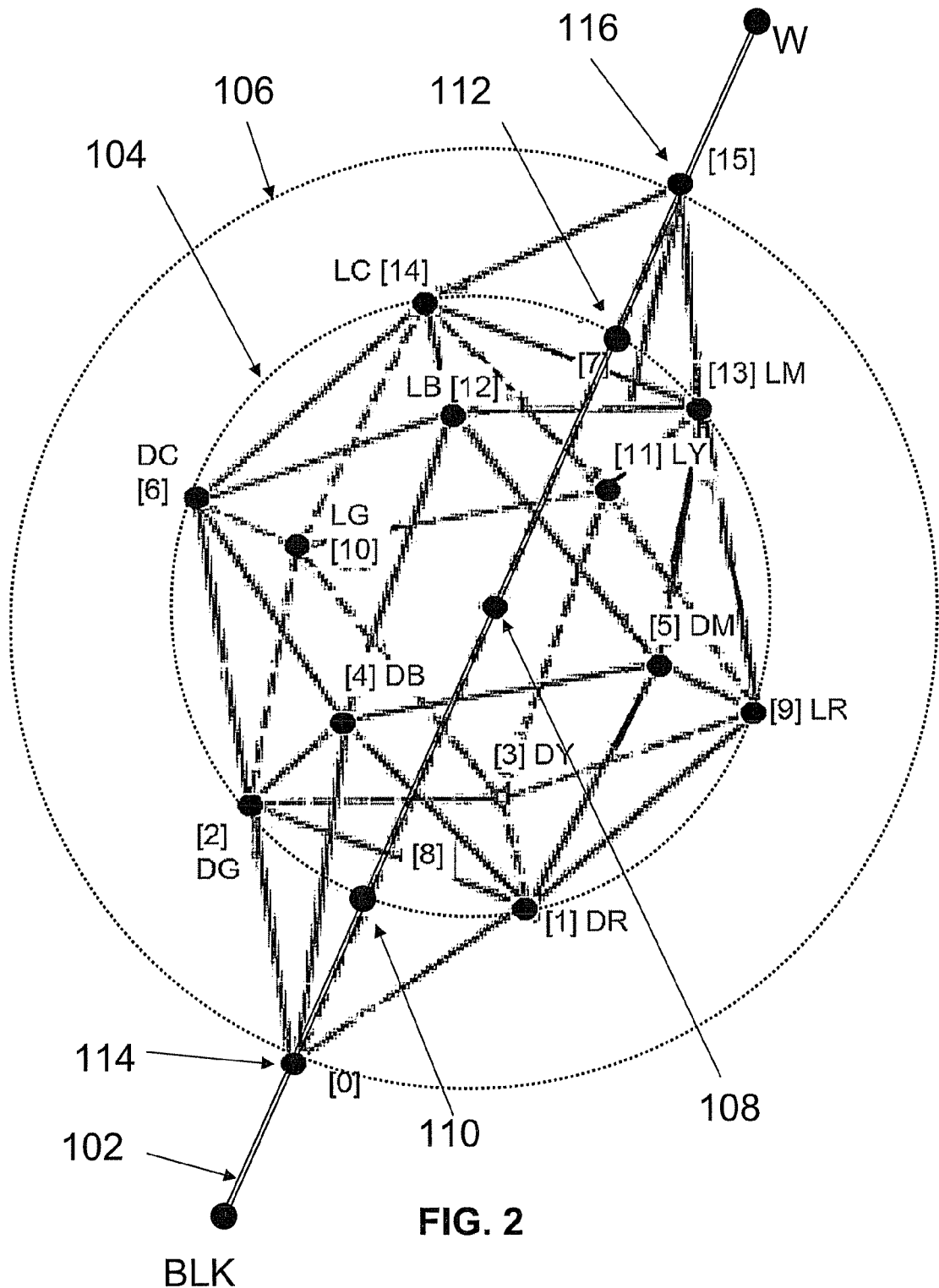
FIG. 2 is a schematic view of an exemplary arrangement for determining color coordinates in a conversion palette according to an embodiment of the present invention.

FIG. 2 depicts an exemplary embodiment of the present invention in which a polyhedron, an icosahedron, can be used to define the color coordinates for non-neutral colors according to the present invention. As shown in FIG. 2, the vertices of an icosahedron can define a 4 bit color conversion palette (16 colors). As previously described, dark grey [8], light grey [7], black [0], and white [15] color coordinates can be defined by the intersection of the neutral axis 102 with the spheres 104, 106 projecting from the center 108 of the cube 100. The color coordinates for the remaining twelve (12) non-neutral colors, [1]-[6] and [9]-[14], can be defined by the twelve (12) vertices of the icosahedron, where the neutral axis 102 defines the axis of symmetry for the icosahedron.

As previously described, the sphere 104 can have a radius of any size. However, as the size of the sphere 104 is reduced, the differences between the color coordinates in the conversion palette are reduced and the contrast between the resulting colors is also reduced. Therefore, one method of increasing contrast between colors is to position the polyhedron so that the number of vertices intersecting the sides or edges of the RGB cube 100 is maximized. Accordingly, the mathematical relationship between the vertices can be defined in terms of the golden ratio, $(^2\sqrt{5}+1)/2$, scaled for the RGB cube 100. Accordingly, the vertices can define the sphere 104 which can be used with the neutral axis 102 to define color coordinates for intersections 110, 112 defining dark gray and light gray color coordinates. As previously described, the sphere 106 can have a volume twice that of sphere 104 and can be used with the cube diagonal 102 to define color coordinates for intersections 114, 116 defining black and white color coordinates. As a result, the color coordinates for the 16 colors, as shown in FIG. 2, can be mathematically related to the center of the color cube 100, as shown in Table 1.

TABLE 1

Color coordinates for 4 bit color conversion palette using icosahedron

| Id | Color | Red Coordinate | Green Coordinate | Blue Coordinate |
|---|---|---|---|---|
| [0] | Black | $256/2[1 - (^2\sqrt{(2-\phi)}*^3\sqrt{2}/^2\sqrt{3})]$ | $256/2[1 - (^2\sqrt{(2-\phi)}*^3\sqrt{2}/^2\sqrt{3})]$ | $256/2[1 - (^2\sqrt{(2-\phi)}*^3\sqrt{2}/^2\sqrt{3})]$ |
| [1] | Dark Red (DR) | $256/2$ | $0$ | $256/2[1 - \phi']$ |
| [2] | Dark Green (DG) | $256/2[1 - \phi']$ | $256/2$ | $0$ |
| [3] | Dark Yellow (DY) | $256/2[1 + \phi']$ | $256/2$ | $0$ |
| [4] | Dark Blue (DB) | $0$ | $256/2[1 - \phi']$ | $256/2$ |
| [5] | Dark Magenta (DM) | $256/2$ | $0$ | $256/2[1 + \phi']$ |
| [6] | Dark Cyan (DC) | $0$ | $256/2[1 + \phi']$ | $256/2$ |
| [7] | Light Gray (LG) | $256/2[1 + (^2\sqrt{(2-\phi)}/^2\sqrt{3})]$ | $256/2[1 + (^2\sqrt{(2-\phi)}/^2\sqrt{3})]$ | $256/2[1 + (^2\sqrt{(2-\phi)}/^2\sqrt{3})]$ |
| [8] | Dark Gray (DG) | $256/2[1 - (^2\sqrt{(2-\phi)}/^2\sqrt{3})]$ | $256/2[1 - (^2\sqrt{(2-\phi)}/^2\sqrt{3})]$ | $256/2[1 - (^2\sqrt{(2-\phi)}/^2\sqrt{3})]$ |
| [9] | Light Red (LR) | $256$ | $256/2[1 - \phi']$ | $256/2$ |
| [10] | Light Green (LG) | $256/2$ | $256$ | $256/2[1 - \phi']$ |
| [11] | Light Yellow (LY) | $256$ | $256/2[1 + \phi']$ | $256/2$ |
| [12] | Light Blue (LB) | $256/2[1 - \phi']$ | $256/2$ | $256$ |
| [13] | Light Magenta (LM) | $256/2[1 + \phi']$ | $256/2$ | $256$ |
| [14] | Light Cyan (LC) | $256/2$ | $256$ | $256/2[1 + \phi']$ |
| [15] | White | $256/2[1 + (^2\sqrt{(2-\phi)}*^3\sqrt{2}/^2\sqrt{3})]$ | $256/2[1 + (^2\sqrt{(2-\phi)}*^3\sqrt{2}/^2\sqrt{3})]$ | $256/2[1 + (^2\sqrt{(2-\phi)}*^3\sqrt{2}/^2\sqrt{3})]$ |

Where:
$\phi = (^2\sqrt{5}+1)/2$ (Golden ratio)
$\phi' = (^2\sqrt{5}-1)/2$
$\phi * \phi' = [(^2\sqrt{5}+1)/2] * [(^2\sqrt{5}-1)/2] = 1$
$\phi - \phi' = [(^2\sqrt{5}+1)/2] - [(^2\sqrt{5}-1)/2] = 1$
$\phi - 1 = \phi'$
$\phi'^2 + 1 = \phi' * \phi' + 1 = \phi'(\phi - 1) + 1 = \phi' * \phi - \phi' + 1 = 1 - \phi' + 1 = 2 - \phi'$ (Radius Squared)

Figure 3:
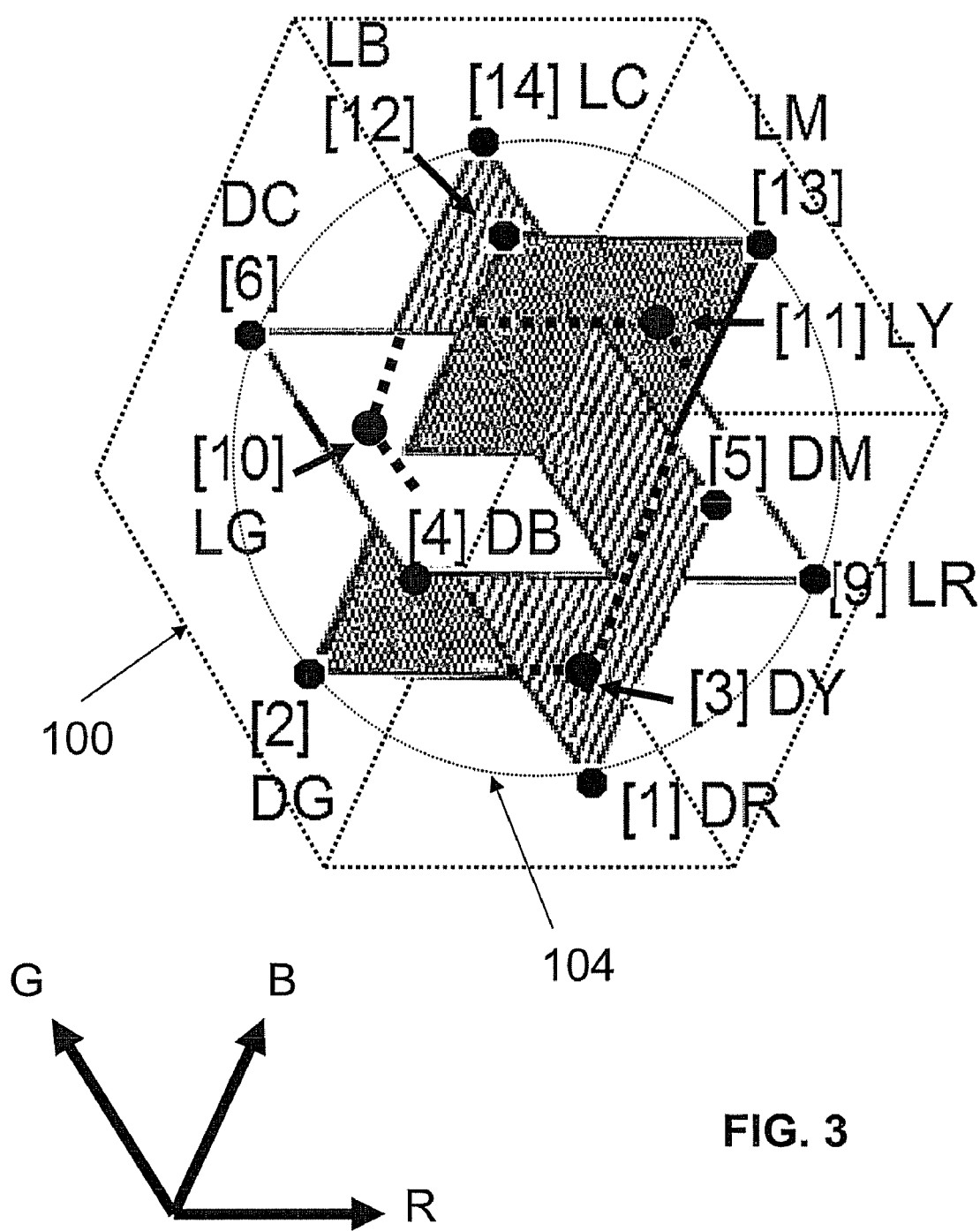
FIG. 3 is a schematic view of an exemplary arrangement of non-neutral color coordinates in an RGB color cube according to an embodiment of the present invention.

For the coordinates in Table 1, the $^2\sqrt{3}$ divisor generates projections of cube diagonal onto the R, G or B coordinate axes. Similarly, the $^3\sqrt{2}$ multiplier defines coordinates on sphere 106 having double the volume of sphere 104. Accordingly, the color coordinates in Table 1 can result in the non-neutral colors defining the golden rectangles of the icosahedron within the RGB color cube 100, as shown in FIG. 3. However, the present invention is not limited to using an icosahedron or other symmetric polyhedrons and any other arrangement of points on the sphere 104 and symmetric about the neutral axis can be used to define the color coordinates for non-neutral colors in the conversion palette.

Figure 4:
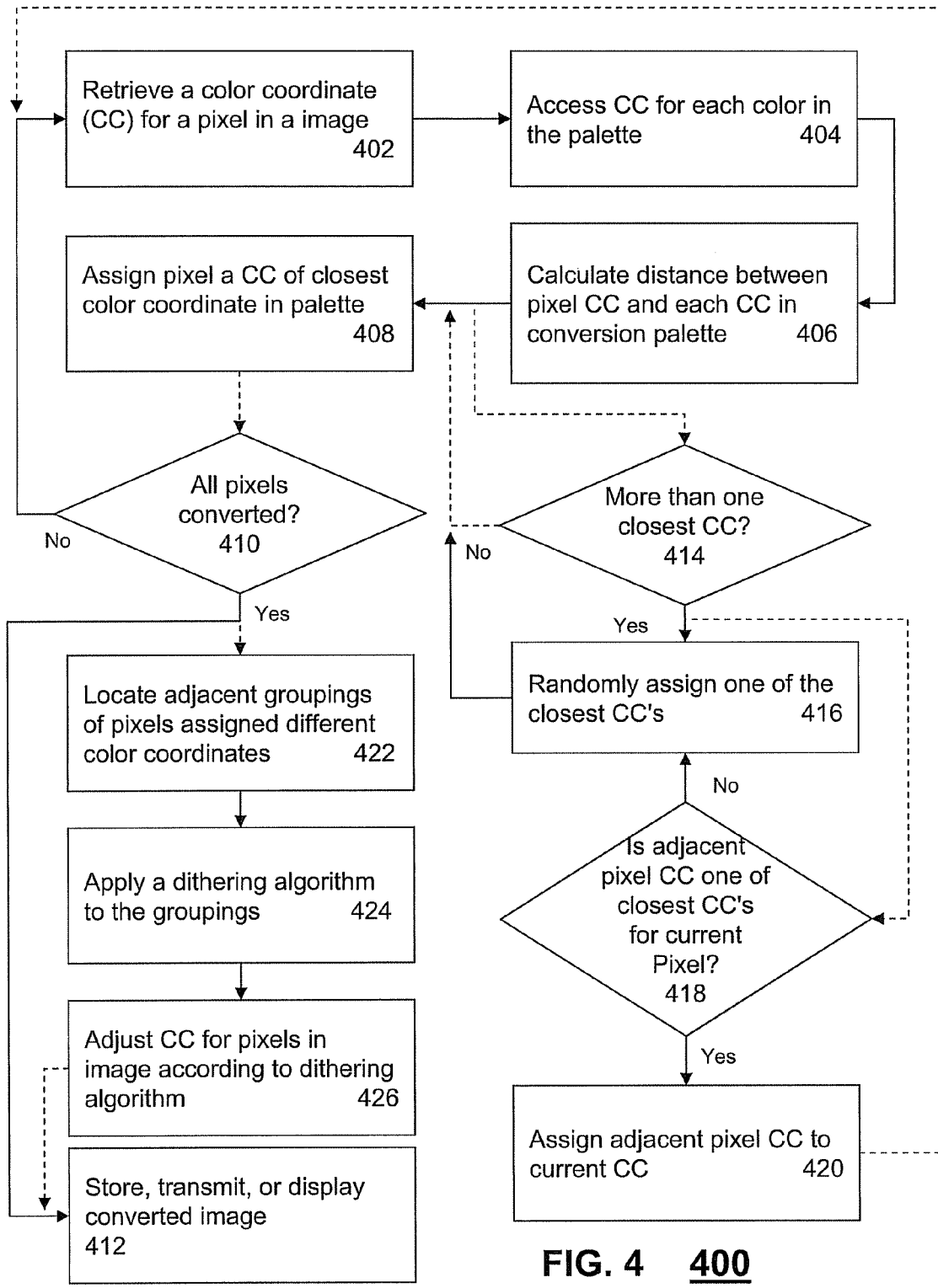
FIG. 4 is a flowchart of exemplary steps of a method for color conversion according to an embodiment of the present invention.

FIG. 4 is a flowchart illustrating steps in an exemplary method 400 for color conversion using a color conversion palette in accordance with an embodiment of the present invention. Method 400 beings with step 402 in which the color coordinate for the pixel in an image is retrieved. Any type of image can be converted using method 400, including drawings, illustrations, or photographs. Additionally, method 400 can also be applied to one or more frames of a film or video. The color coordinates for the pixel can be stored in either local or remote locations, depending on the application. Referring still to FIG. 4, once the color coordinate for a pixel is retrieved in step 402, the color coordinates stored in the color conversion palette can be accessed in step 404. In various embodiments of the present invention, the color conversion palette may be accessed from a specific location, remote or local, in a memory element. The location can then be accessed as needed during execution of the method 400. In some embodiments, the color coordinates can be accessed and stored in an active memory of the application, allowing direct and faster access to the memory location.

Regardless of the storage location of the color coordinates in the palette, in step 406 the distance in RGB color space between the color coordinates of the pixel and each of the color coordinates in the color conversion palette can be calculated. After performing the calculations in step 406, the pixel is assigned a new color coordinate in step 408, the new color coordinate corresponding to the closest color coordinate in the conversion palette. Subsequently, if other pixels in the image still need to be converted in step 410, steps 402-408 can be repeated until color coordinates for all pixels in the image have been converted to one of the color coordinates in the color conversion palette. Once all pixels have been converted in step 410, the image can be stored, transmitted, or displayed in step 412.

In some cases, a color coordinate of a pixel can be equidistant from two or more color coordinates in the color conversion palette. Thus, additional steps can be provided before assigning a new color coordinate to a pixel in step 408. For example, if the calculations from step 406 show in step 414 that two color coordinates in the conversion palette are closest to the color coordinate of the pixel, the method 400 in step 416 can assign a color coordinate randomly from these two closest color coordinates. The method can then continue for the remaining pixels, as previously described.

However, instead of assigning color coordinates randomly to such pixels, the color coordinate of surrounding or adjacent pixels can be considered in assigning a color from the conversion palette. For example, in step 418, the method 400 can compare the current and an adjacent converted pixel in an image. If the color coordinate for the adjacent pixel is one of the color coordinates found in step 414, then in step 420, the pixel can be assigned the same color coordinate as the adjacent pixel. Otherwise, the pixel can be assigned one of the closest color coordinates at random in step 416. The method 400 can then be repeated for the remaining pixels, as previously described.

In some embodiments, random or ordered dithering methods can be applied to the converted image to further improve the aesthetic quality of the converted image. For example, Referring still to FIG. 4, once it is determined that all pixels in the image have been converted to one of the colors defined in the conversion palette in step 410, the method 400 can locate in step 422 adjacent groupings of pixels in the image assigned different color coordinates. Once such groupings are located in step 422, the method 400 in step 424 can apply a dithering algorithm to at least a portion of the image to determine if a dithering pattern needs to applied to one or more regions of pixels or if no pattern should be applied. The dithering algorithm can be configured to make this determination based on the original image, the converted image, or any combination thereof.

Once the dithering algorithm has analyzed the image in step 424, the method 400 in step 426 can adjust color coordinates according to the dithering algorithm. According to the present invention, any type of dithering pattern can be used. By way of example and not by way of limitation, dithering patterns can include average, ordered, random, Albie, Floyd-Steinberg, Jarvis, Atkinson, or Riemersma dithering patterns. Once the color coordinates for the pixels are adjusted in step 426 according to the dithering algorithm, the color conversion is complete and the converted image can then be stored, transmitted or displayed according to the application in step 412.

Other modifications to the invention as described above are within the scope of the claimed invention. For example, prior to converting the image using the color conversion palette, the brightness or contrast of the image can be increased or decreased, adjusting the distribution of the original color coordinates for the pixels in RGB color space. In another example, when a grouping of pixels is determined to be equidistant in RGB color space from two or more color coordinates, a dithering pattern can be applied to the grouping. In yet another example, application of a dithering algorithm can be done in parallel with the color conversion. These are but a few examples of modifications that can be applied to the present disclosure without departing from the scope of the claims stated below. Accordingly, the reader is directed to the claims section for a fuller understanding of the breadth and scope of the present disclosure.

Figure 5:
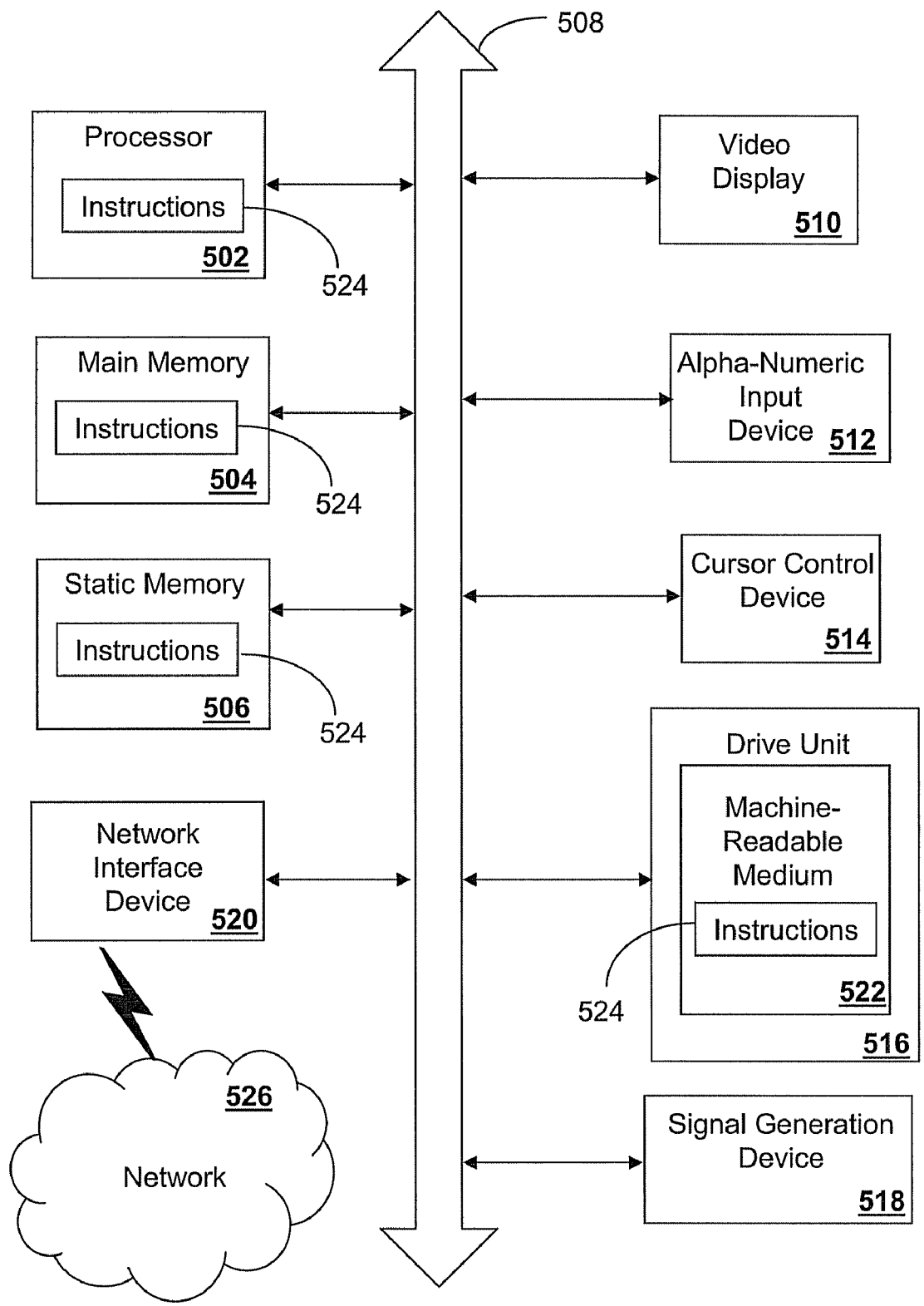
FIG. 5 is a schematic view of a computer system within which a set of instructions operate according to an embodiment of the invention.

FIG. 5 is a schematic diagram of a computer system 500 for executing a set of instructions that, when executed, can cause the computer system to perform any one or more of the methodologies and procedures described above. In some embodiments, the computer system 500 operates as a standalone device. In some embodiments, the computer system 500 can be connected (e.g., using a network) to other computing devices. In a networked deployment, the computer system 500 can operate in the capacity of a server or a client user machine in server-client user network environment, or as a peer machine in a peer-to-peer (or distributed) network environment.

The machine can comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 500 can include a processor 502 (e.g., a central processing unit (CPU), a graphics processing unit (GPU, or both), a main memory 504 and a static memory 506, which communicate with each other via a bus 508. The computer system 500 can further include a display unit 510 such as a video display (e.g., a liquid crystal display or LCD), a flat panel, a solid state display, or a cathode ray tube (CRT)). The computer system 500 can include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 can include a computer-readable storage medium 522 on which is stored one or more sets of instructions 524 (e.g., software code) configured to implement one or more of the methodologies, procedures, or functions described herein, including those methods illustrated above. The instructions 524 can also reside, completely or at least partially, within the main memory 504, the static memory 506, and/or within the processor 502 during execution thereof by the computer system 500. The main memory 504 and the processor 502 also can constitute machine-readable media.

Dedicated hardware implementations including, but not limited to, application-specific integrated circuits, programmable logic arrays and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but not limited to, distributed processing or component/object distributed processing, parallel processing, or virtual machine processing can also be constructed to implement the methods described herein.

The present disclosure contemplates a computer-readable storage medium containing instructions 524, or that which receives and executes instructions 524 from a propagated signal so that a device connected to a network environment 526 can send or receive voice, video or data, and to communicate over the network 526 using the instructions 524. The instructions 524 can further be transmitted or received over a network 526 via the network interface device 520.

While the computer-readable storage medium 522 is shown in an example embodiment to be a single storage medium, the term "video-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments can be utilized and derived therefrom, such that structural and logical substitutions and changes can be made without departing from the scope of this disclosure. Figures are also merely representational and can not be drawn to scale. Certain proportions thereof may be exaggerated, while others may be minimized. Accordingly, the specification and drawings are to be regarded in an illustrative rather than a restrictive sense.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-implemented method for color conversion in RGB color space in order to reduce the total number of colors used for an image to account for display device, processing device, memory element, or transmission limitations, the method comprising:

configuring a computer system having at least one processor and at least one memory to carry out the following steps:

calculating a distance between each one of a plurality of color coordinates in a conversion palette and a color coordinate for a pixel in an image; and assigning a new color coordinate to said pixel, said new color coordinate comprising a closest one of said plurality of color coordinates in said conversion palette, wherein said plurality of color coordinates in said conversion palette comprise a first point and a second point on a neutral axis of a RGB color cube and on opposite surfaces of a first sphere, a third point and a fourth point on the neutral axis of said RGB color cube and on opposite surfaces of a second sphere, and a plurality of other points evenly distributed over a surface of said first sphere and symmetrically distributed around said neutral axis, wherein a volume of said second sphere is twice the volume of said first sphere, and wherein a center of said first sphere and a center of said second sphere is a center of said RGB color cube.

2. The method of claim 1, wherein said other points are distributed on said second sphere according to the vertices of a symmetric polyhedron.

3. The method of claim 2, wherein said polyhedron comprises an icosahedron.

4. The method of claim 1, further comprising:
prior to said calculating step, adjusting at least one among a brightness level and a contrast level of said image.

5. The method of claim 1, further comprising:
repeating the steps of calculating and assigning for other pixels in said image;
identifying at least one grouping of pixels in said image assigned a first color coordinate of said palette and at least one adjacent grouping of pixels in said image assigned a second color coordinate of said palette, wherein said first color coordinate and said second color coordinate are different; and
applying a dithering pattern using said first and said second color coordinates along an adjoining region of said groupings of pixels.

6. The method of claim 5, wherein said dithering pattern is selected from the group consisting of average dithering patterns, random dithering patterns, and ordered dithering patterns.

7. The method of claim 1, further comprising:
repeating the step of calculating for other pixels in said image;
identifying at least one grouping of pixels equidistant to at least two of said plurality of color coordinates in said palette; and
applying a dithering pattern to said grouping of pixels, said dithering pattern using said at least two of said plurality of color coordinates.

8. The method of claim 7, wherein a dithering pattern is selected from the group consisting of average dithering patterns, random dithering patterns, and ordered dithering patterns.

9. The method of claim 1, further comprising:
repeating said calculating step for a pixel adjacent to said pixel; and
assigning said adjacent pixel said assigned color coordinate of said pixel if a color coordinate for said adjacent pixel is equidistant to the assigned color coordinate of said pixel and at least one other coordinate in said palette.

10. A system for color conversion comprising:
a mass storage element for storing a conversion palette, said conversion palette comprising a plurality of colors in RGB color space, wherein said plurality of color coordinates in said conversion palette comprise a first point and a second point on a neutral axis of a RGB color cube and on opposite surfaces of a first sphere, a third point and a fourth point on the neutral axis of said RGB color cube and on opposite surfaces of a second sphere, and a plurality of other points evenly distributed over a surface of said first sphere and symmetrically distributed around said neutral axis, wherein a volume of said second sphere is twice the volume of said first sphere, and wherein a center of said first sphere and a center of said second sphere is a center of said RGB color cube;
a processing element for assigning a new color coordinate to a pixel in an image from said plurality of colors in said conversion palette, wherein said new color coordinate comprises a one of said plurality of color coordinates in said conversion palette closest in said RGB color space to an original color coordinate for said pixel.

11. The system of claim 10, wherein said other points are distributed on said first sphere according to the vertices of a polyhedron.

12. The system of claim 10, wherein said processing element is further configured to apply a dithering pattern to at least a portion of said image, wherein said dithering pattern is at least one among a random dithering pattern and an ordered dithering pattern.

13. A machine-readable storage having stored thereon, a computer program having a plurality of code sections, said code sections executable by a machine causing the machine to perform the steps of:
calculating a distance in RGB color space between each one of a plurality of color coordinates in a conversion palette and a color coordinate for a pixel in an image; and
assigning a new color coordinate to said pixel, said new color coordinate comprising a closest one of said plurality of color coordinates in said conversion palette,
wherein said plurality of color coordinates in said conversion palette comprise a first point and a second point on a neutral axis of an RGB color cube and on opposite surfaces of a first sphere, a third point and a fourth point on the neutral axis of said RGB color cube and on opposite surfaces of a second sphere, and a plurality of other points evenly distributed over a surface of said first sphere and symmetrically distributed around said neutral axis, wherein a volume of said second sphere is twice the volume of said first sphere, and wherein a center of said first sphere and a center of said second sphere is a center of said RGB color cube.

14. The machine-readable storage of claim 13, wherein said other points are distributed on said first sphere according to the vertices of an icosahedron.

15. The machine-readable storage of claim 13, further comprising code sections executable by the machine to cause the machine to perform the steps of:
prior to said calculating step, adjusting at least one among a brightness level and a contrast level of said image.

16. The machine-readable storage of claim 13, further comprising code sections executable by the machine to cause the machine to perform the steps of:
repeating the steps of calculating and assigning for other pixels in said image;
identifying at least one grouping of pixels in said image assigned a first color coordinate of said palette and at least one adjacent grouping of pixels in said image assigned a second color coordinate of said palette, wherein said first color coordinate and said second color coordinate are different; and applying a dithering pattern using said first and said second color coordinates along an adjoining region of said groupings of pixels.

17. The machine-readable storage of claim 16, wherein said dithering pattern is selected from the group consisting of average dithering patterns, random dithering patterns, and ordered dithering patterns.

18. The machine-readable storage of claim 13, further comprising code sections executable by the machine to cause the machine to perform the steps of:

repeating the step of calculating for other pixels in said image;

identifying at least one grouping of pixels equidistant to at least two of said plurality of color coordinates in said palette; and applying a dithering pattern containing said at least two of said plurality of color coordinates in said grouping of pixels.

19. The machine-readable storage of claim 18, wherein a dithering pattern is selected from the group consisting of average dithering patterns, random dithering patterns, and ordered dithering patterns.

20. The machine-readable storage of claim 13, further comprising code sections executable by the machine to cause the machine to perform the steps of:

repeating said calculating step for a pixel adjacent to said pixel; and assigning said adjacent pixel said assigned color coordinate of said pixel if a color coordinate for said adjacent pixel is equidistant to the assigned color coordinate of said pixel and at least one other coordinate in said palette.

* * * * *